US011514681B2

(12) United States Patent
Kaku et al.

(10) Patent No.: US 11,514,681 B2
(45) Date of Patent: Nov. 29, 2022

(54) SYSTEM AND METHOD TO FACILITATE CALIBRATION OF SENSORS IN A VEHICLE

(71) Applicant: Toyota Research Institute, Inc., Los Altos, CA (US)

(72) Inventors: Shunsho Kaku, Mountain View, CA (US); Mohammad Saad, San Mateo, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 358 days.

(21) Appl. No.: 16/887,236

(22) Filed: May 29, 2020

(65) Prior Publication Data

US 2021/0374432 A1 Dec. 2, 2021

(51) Int. Cl.
*G06K 9/00* (2022.01)
*G01C 21/32* (2006.01)
(Continued)

(52) U.S. Cl.
CPC ............. *G06V 20/56* (2022.01); *B60W 50/14* (2013.01); *G01C 21/32* (2013.01); *B60W 2050/146* (2013.01); *B60W 2754/10* (2020.02)

(58) Field of Classification Search
CPC .. G06V 20/56; B60W 50/14; B60W 2754/10; B60W 2050/146; G01C 21/32; G01B 21/042; G01S 7/4972
(Continued)

(56) References Cited

U.S. PATENT DOCUMENTS 8,862,384 B2 10/2014 Stahlin et al.
9,719,801 B1 8/2017 Ferguson et al.
(Continued)

FOREIGN PATENT DOCUMENTS

CN 101013158 A * 8/2007 ........... G01S 13/723
DE 102012218123 A1 4/2014
DE 102015118874 A1 * 5/2017

OTHER PUBLICATIONS

Dongwook et al., "Compound Road Environment Recognition Method Using Camera and Laser Range Finder," 2016, Publisher: IEEE.*
(Continued)

*Primary Examiner* — Tuan C To
(74) *Attorney, Agent, or Firm* — Christopher G Darrow; Darrow Mustafa PC

(57) ABSTRACT

A sensor calibration system for a vehicle includes one or more processors. The system also includes a memory communicably coupled to the one or more processors and storing a sensor calibration module including instructions that when executed by the one or more processors cause the one or more processors to, for an environment sensor of the vehicle, determine if the sensor can detect at least a predetermined number of viable reference features in an environment of the vehicle. The module also includes processor-executable instructions to, if the sensor cannot not detect at least a predetermined number of viable reference features, determine at least one suggested positional arrangement of viable reference features with respect to a current position the sensor. The module also includes processor-executable instructions to generate instructions to arrange viable reference features in the at least one suggested positional arrangement.

18 Claims, 9 Drawing Sheets

(51) Int. Cl.
*B60W 50/14* (2020.01)
*G06V 20/56* (2022.01)

(58) Field of Classification Search
USPC ........................................................ 382/104
See application file for complete search history.

(56) References Cited

U.S. PATENT DOCUMENTS

| | | | |
|---|---|---|---|
| 10,788,316 B1* | 9/2020 | Kalscheur | G01S 7/4972 |
| 10,916,035 B1* | 2/2021 | Kroeger | G06T 7/80 |
| 10,989,562 B2* | 4/2021 | Ozog | G01S 7/52004 |
| 2004/0073360 A1* | 4/2004 | Foxlin | G01C 21/16 |
| | | | 342/357.31 |
| 2004/0133376 A1* | 7/2004 | Uffenkamp | G06T 7/80 |
| | | | 702/104 |
| 2005/0057647 A1* | 3/2005 | Nowak | G06V 10/147 |
| | | | 348/142 |
| 2006/0164295 A1* | 7/2006 | Focke | G01S 13/867 |
| | | | 342/174 |
| 2010/0076709 A1* | 3/2010 | Hukkeri | G01S 17/87 |
| | | | 356/6 |
| 2016/0137209 A1* | 5/2016 | Stainvas Olshansky | |
| | | | G01C 25/00 |
| | | | 701/300 |
| 2016/0161602 A1* | 6/2016 | Prokhorov | G01S 7/4972 |
| | | | 702/97 |
| 2020/0018852 A1 | 1/2020 | Walls et al. | |
| 2020/0410715 A1* | 12/2020 | Cadien | G01S 13/867 |
| 2021/0303898 A1* | 9/2021 | Wang | G06V 20/10 |
| 2021/0316669 A1* | 10/2021 | Wang | G01S 13/867 |

OTHER PUBLICATIONS

Dezhi et al., "A method of spatial calibration for camera and radar," 2010, Publisher: IEEE.*

Scott et al., "Calibration and Unwrapping of the Normalized Scattering Cross Section for the Cyclone Global Navigation Satellite System," 2016, vol. 54, Publisher: IEEE.*

* cited by examiner

SYSTEM AND METHOD TO FACILITATE CALIBRATION OF SENSORS IN A VEHICLE

TECHNICAL FIELD

The subject matter described herein relates to detection of out-of-calibration conditions in sensors of vehicles and re-calibration of the sensors.

BACKGROUND

Over time and due to continuous use, shock and vibration experienced by the vehicle, vehicle sensors may fall out of calibration. When not properly calibrated, the sensors may provide inaccurate data. Because sensor data is processed and used for decision-making by vehicle systems (especially autonomous driving systems), it is important for the sensors to remain calibrated so as to provide sensor data which is sufficiently accurate for sound computer-based driving decision-making. However, it may be difficult for a vehicle owner to determine when any given sensor is out of calibration, and the user may be forced to take the vehicle into a dealer to check sensor calibration and to have the sensors re-calibrated.

SUMMARY

In one aspect of the embodiments described herein, a sensor calibration system for a vehicle is provided. The system includes one or more processors. The system also includes a memory communicably coupled to the one or more processors and storing a sensor calibration module including instructions that when executed by the one or more processors cause the one or more processors to, for an environment sensor of the vehicle, determine if the sensor can detect at least a predetermined number of viable reference features in an environment of the vehicle. The module also includes processor-executable instructions to, if the sensor cannot not detect at least a predetermined number of viable reference features, determine at least one suggested positional arrangement of viable reference features with respect to the a current position the sensor. The module also includes processor-executable instructions to generate instructions to arrange viable reference features in the at least one suggested positional arrangement.

In another aspect of the embodiments described herein, a non-transitory computer readable medium is provided for determining modifications to a vehicle environment to facilitate calibration of an environment sensor of a vehicle. The medium has stored therein instructions that, when executed by a computing system, cause the computing system to perform functions including, by an environment sensor of a vehicle, determining if the sensor can detect at least a predetermined number of viable reference features in an environment of the vehicle. The medium also has stored therein instructions to, if the sensor cannot not detect at least a predetermined number of viable reference features in the vehicle environment, determine at least one suggested positional arrangement of viable reference features with respect to a current position the sensor. The medium also has stored therein instructions to generate instructions to arrange viable reference features in the at least one suggested positional arrangement.

In yet another aspect of the embodiments described herein, a method for modifying or adapting a vehicle environment to facilitate calibration of a sensor is provided. The method includes a step of, by an environment sensor of the vehicle, determining if the sensor can detect at least a predetermined number of viable reference features in the vehicle environment. The method also includes a step of, if the sensor cannot not detect at least a predetermined number of viable reference features in the vehicle environment, determining at least one suggested positional arrangement of viable reference features with respect to a current position the sensor. The method includes a step of generating instructions to arrange viable reference features in the at least one suggested positional arrangement.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
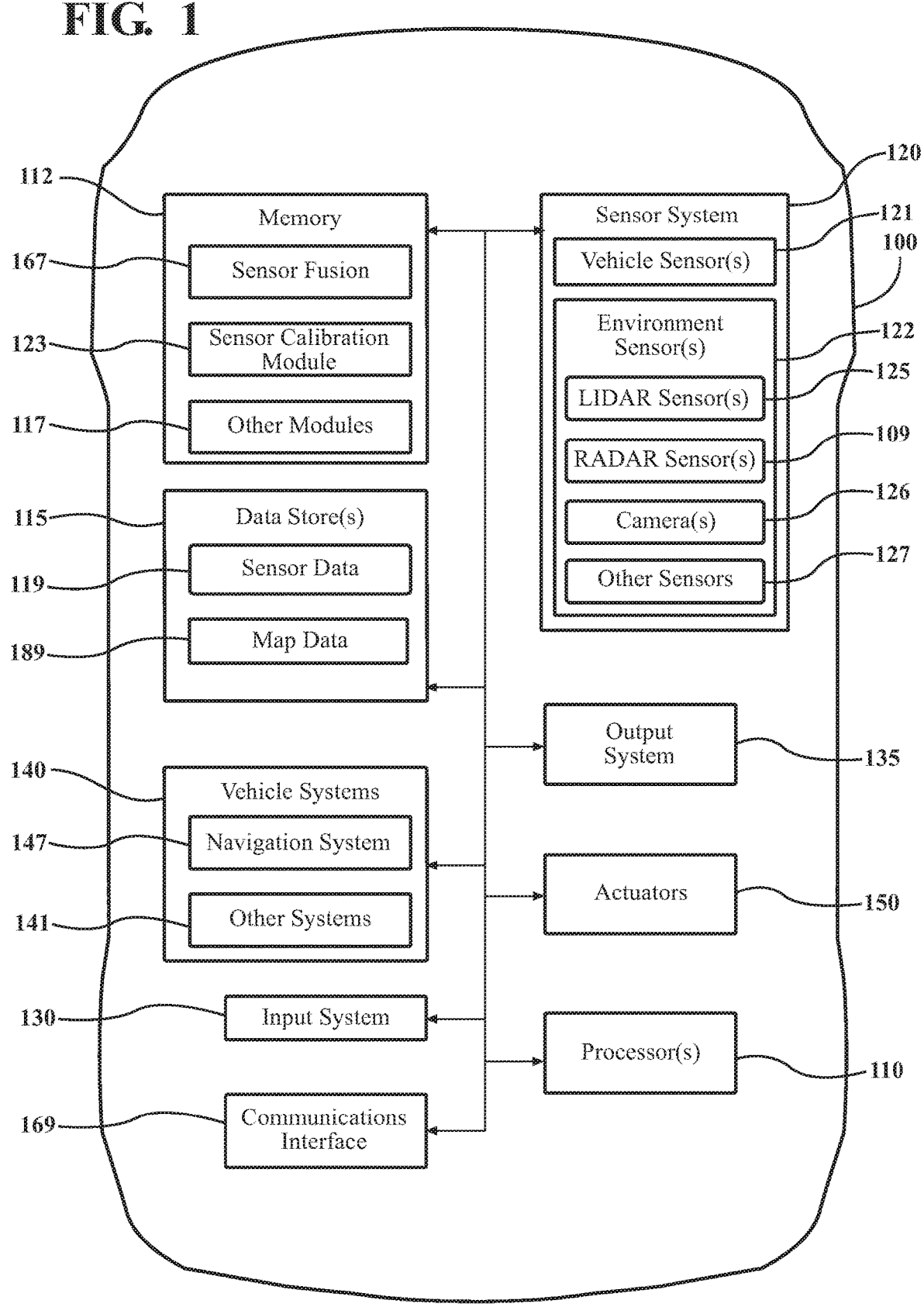
FIG. 1 is a block schematic diagram of a vehicle incorporating a system for controlling an internal combustion engine start threshold in a parallel hybrid-electric vehicle in accordance with embodiments described herein.

Referring to FIG. 1, an example of a vehicle 100 is illustrated. As used herein, a "vehicle" is any form of motorized transport. In one or more implementations, the vehicle 100 is a conventional passenger vehicle. While arrangements will be described herein with respect to passenger vehicles, it will be understood that embodiments are not limited to passenger vehicles. In some implementations, the vehicle 100 may be any form of motorized transport that benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100.

Some of the possible elements of the vehicle 100 are shown in FIG. 1 and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 1 shows a block schematic diagram of a vehicle 100 incorporating a sensor calibration system in accordance with embodiments described herein. In some instances, the vehicle 100 may be configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that can operate in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one or more arrangements, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along the travel route.

The vehicle 100 can include one or more processors 110. In one or more arrangements, the processor(s) 110 can be a main processor(s) of the vehicle 100. For instance, the processor(s) 110 can be an electronic control unit (ECU). The vehicle 100 can include one or more data stores 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operably connected to the processor(s) 110 for use thereby. The term "operably connected," as used throughout this description, can include direct or indirect connections, including connections without direct physical contact.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more radar sensors 109 of the sensor system 120.

In one or more arrangements, the one or more data stores 115 can include map data 189. The map data 189 can include maps of one or more geographic areas. In some instances, the map data 189 can include information or data on roads, traffic control devices, road markings, structures, features of interest, and/or landmarks in the one or more geographic areas. The map data 189 can be in any suitable form. In some instances, the map data 189 can include aerial views of an area. In some instances, the map data 189 can include ground views of an area, including 360-degree ground views. The map data 189 can include measurements, dimensions, distances, and/or information for one or more items included in the map data 189 and/or relative to other items included in the map data 189. The map data 189 can include a digital map with information about road geometry, road grades and slopes, and other road information, including information about a road on which the vehicle 100 is currently traveling. The map data 189 can be high quality and/or highly detailed. In one or more arrangements, the map data 189 may be updated continuously (i.e., as soon as information relating to revisions becomes available) or regularly from a cloud source or other source exterior of the vehicle.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process. In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or other element(s) of the vehicle 100 (including any of the elements shown in FIG. 1).

The sensor system 120 can include any suitable type of sensor. Various examples of different types of sensors will be described herein. However, it will be understood that the embodiments are not limited to the particular sensors described. Various examples of sensors of the sensor system 120 are described herein. The example sensors may be part of the one or more environment sensors 122 and/or the one or more vehicle sensors 121. However, it will be understood that the embodiments are not limited to the particular sensors described. The sensor system 120 may include any sensors suitable for and/or required to perform any of the data acquisition and/or vehicle control operations contemplated herein.

Sensors of sensor system 120 may be communicably coupled to the various systems and components of the vehicle 100. The sensors may be operably connected to the vehicle wireless communications interface 169 for transmission of information (or receipt of information from) to a cloud or other storage facility or for vehicle-to-vehicle (V2V) or vehicle-to-everything (V2X) communications. The sensors may also be operably connected to other vehicle systems and components, such as data stores 115 and processor(s) 110, for storage and processing of vehicle and environment sensor data.

Sensors of sensor system 120 may be mounted on the vehicle 100 using, for example, motors, chain drives, gears, tracks, and/or any other suitable mechanisms, so as to enable control of the orientations, positions, power levels, and any other operating parameters of the sensors.

The sensor system 120 can include one or more vehicle sensors 121. The vehicle sensor(s) 121 can detect, determine, and/or sense information about the vehicle 100 itself and/or any occupants inside the vehicle. The vehicle sensor(s) 121 may include sensors configured to detect conditions and/or events inside the vehicle interior or occupant compartment. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100, such as the current geographical location of the vehicle. In one or more arrangements, the vehicle sensor(s) 121 can include a speedometer to determine a current speed and acceleration/deceleration of the vehicle 100. The vehicle sensor(s) 121 may include vehicle directional sensors (not shown) configured to determine a current heading of the vehicle or direction in which the vehicle is pointed. The vehicle sensor(s) 121 may include sensors configured to sense aspects of the vehicle mechanical and electrical components and/or systems, to aid in determining a mechanical condition of the vehicle and existing and/or potential problems with the vehicle.

The sensor system 120 can include one or more environment sensors 122 configured to acquire data of at least a portion of the external environment of the vehicle 100 (e.g., nearby objects). The environment sensors 122 may detect data or information about the external environment in which the vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, text and other printed matter, traffic lights, traffic signs, lane lines, crosswalks, curbs proximate the vehicle 100, off-road objects, weather conditions, other vehicles, etc. As an example, in one or more arrangements, the environment sensors 122 can include one or more radar sensors 109, one or more LIDAR sensors 125, one or more cameras 126, and/or other types of sensors 127. Environment sensors such as radar 109, LIDAR 125, camera(s) 126, and/or other sensors may be usable to detect characteristics (such as size, shape, color, dimensions, etc.) of objects or features in the environment exterior of the vehicle.

Referring again to FIG. 1, a sensor fusion algorithm 167 may be an algorithm (or a computing device storing an algorithm) configured to accept data from the sensor system 120 as an input. The data may include, for example, data representing information sensed at the sensors of the sensor system 120. The sensor fusion algorithm 167 may include or be configured to be executed using, for instance, a Kalman filter, Bayesian network, or other algorithm. The sensor fusion algorithm 167 may provide various assessments based on the data from sensor system 120. Depending upon the embodiment, the assessments may include evaluations of individual objects and/or features in the environment of vehicle 100, evaluations of particular situations, and/or evaluations of possible impacts based on the particular situation. Other assessments are possible.

The vehicle wireless communications interface 169 may be configured to enable and/or facilitate communication between the components and systems of the vehicle and entities (such as cloud facilities, cellular and other mobile communications devices, other vehicles, remote servers, pedestrians, etc.) exterior of the vehicle. Wireless communications interface 169 may be configured to facilitate, establish, maintain, and end wireless V2V and V2X communications with any extra-vehicular entity, for example other connectibly-configured vehicles and connected vehicles, pedestrians, servers and entities located in the cloud, edge servers, and other information sources and entities. Information such as location of the vehicle 100 and/or elements of the vehicle, coordinates of reference features usable for calibration-related purposes, and other types of information may be transmitted and received via the communications interface 169. If required, wireless communications interface 169 may incorporate or be in communication with any network interfaces needed to communicate with any extra-vehicular entities and/or networks.

The vehicle 100 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between a user and the vehicle. The input system 130 can receive an input from a vehicle occupant (e.g., a driver or a passenger) or a user located remotely from the vehicle 100. The vehicle 100 can also include an output system 135.

An "output system" includes any device, component, or arrangement or groups thereof (for example, a display screen) that enable information/data to be presented to a vehicle occupant (e.g., a driver, a vehicle passenger, etc.) or a remote user.

The vehicle 100 can include one or more vehicle systems, collectively designated 140. In various embodiment of the vehicle 100, the vehicle systems (not shown) may include a propulsion system, a braking system, a steering system, throttle system, a suspension system, a transmission system, and/or a navigation system. It should be appreciated that although particular vehicle systems may be separately defined, each or any of the systems or portions thereof may be otherwise combined or segregated via hardware and/or software within the vehicle 100. Each of the vehicle systems can include one or more devices, components, and/or a combination thereof, now known or later developed.

The vehicle systems 140 can include a navigation system 147. The navigation system 147 can include one or more devices, applications, and/or combinations thereof, now known or later developed, configured to determine the geographic location of the vehicle 100 and/or to determine a travel route for the vehicle 100. The navigation system 147 can include a global positioning system, a local positioning system or a geolocation system. The navigation system 147 may be configured to track the path of a vehicle along a travel route. The navigation system 147 may be configured to operate in conjunction with an autonomous driving module to guide the vehicle along a travel route selected by a user.

The navigation system 147 may be configured for operative communication with a positioning system (such as a GPS system) enabling location and tracking of the vehicle within a fixed frame of reference. The navigation system may be in communication (either directly of through vehicle wireless communications interface 169) with a GPS system or other navigational system enabling the vehicle 100 and/or reference locations within the space envelope occupied by the vehicle (for example, positions of one or more sensors in the vehicle) to be constantly monitored, recorded, and communicated.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110, any of the modules stored in memory 112, and/or any other vehicle components or systems. Any suitable actuator can be used. For instance, the one or more actuators 150 can include motors, pneumatic actuators, hydraulic pistons, relays, solenoids, and/or piezoelectric actuators, just to name a few possibilities.

In embodiments described herein, a memory 112 may store sensor calibration module 123. The memory 112 is a random-access memory (RAM), read-only memory (ROM), a hard-disk drive, a flash memory, or other suitable memory for storing the module(s). The module(s) are, for example, computer-readable instructions that when executed by the processor 110, cause the processor(s) 110 to perform the various functions disclosed herein. As used herein, "cause" or "causing" means to make, force, compel, direct, command, instruct, and/or enable an event or action to occur or at least be in a state where such event or action may occur, either in a direct or indirect manner. Additional modules 117 for controlling aspects of vehicle operation may also be stored in memory 112.

The vehicle 100 can include one or more modules, at least one of which (the sensor calibration module 123) is described herein. The module(s) can be implemented as computer-readable program code that, when executed by processor(s) 110, implement one or more of the various processes described herein. One or more of the module(s) can be a component of the processor(s) 110, or one or more of the module(s) can be executed on and/or distributed among other processing systems to which the processor(s) 110 is operably connected. The module(s) can include instructions (e.g., program logic) executable by one or more processor(s) 110. Alternatively, or in addition, one or more of data store(s) 115 or another portion of the vehicle 100 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the module(s) described herein can include artificial or computational intelligence elements, e.g., neural network, fuzzy logic or other machine learning algorithms. Further, in one or more arrangements, one or more of the module(s) can be distributed among a plurality of the modules described herein. In one or more arrangements, two or more of the modules incorporated into the vehicle 100 can be combined into a single module. The processor(s) 110, the sensor calibration module 123, and other modules (if any) can be operably connected to communicate with each other and with the other elements of the vehicle, including various vehicle systems 140 and/or individual components thereof.

The vehicle 100 can include one or more autonomous driving modules 160. The sensor calibration module 123 can be configured to receive data from the sensor system 120 and/or any other type of system capable of capturing information relating to the vehicle 100 and/or the external environment of the vehicle 100. The sensor calibration module 123 can determine (by communication with navigation system 147 a GPS or other positioning system) the position of the vehicle 100. The sensor calibration module 123 can be configured to receive and/or determine (using sensor data) estimates of the locations and other characteristics of physical objects, shapes, patterns and other elements of the vehicle environment detected by sensors configured to detect such features.

The sensor calibration module 123 an be configured to receive sensor and other information for use by the processor(s) 110 and/or the module 123 to estimate positions of the vehicle 100 and detected viable reference features in global coordinates based on signals from a plurality of satellites, or any other data and/or signals that could be used to determine the position of the vehicle 100 and the viable reference features for use in either creating a calibration map or evaluating and/or performing calibration of one or more environment sensors.

In one or more configurations, the sensor calibration module 123 may include instructions that when executed by the one or more processors 110 cause the processor(s) to, for at least one environment sensor of the vehicle, determine if the sensor can detect at least a predetermined number of viable reference features in an environment of the vehicle 100.

A "viable reference feature" is a feature located in an exterior environment of the vehicle 100 and having characteristics (such as position, shape, extent and/or dimensions of the feature) which are detectible by at least one environment sensor of the vehicle 100. The reference feature is considered "viable" when the feature is detectible and distinguishable from other features by at least one environment sensor of the vehicle. In a manner described herein, a calibration module of the vehicle may use sensor data relating to viable reference features for detecting when vehicle sensors are out of calibration and for generating a calibration map which can be used to calibrate sensors found to be out of calibration.

A viable reference feature may be detectible by a radar, LIDAR, camera, or other environment sensor. Non-exclusive examples of viable reference features include solid objects residing on a ground surface (or suspended above ground) and spaced apart from the sensor and two-dimensional designs or patterns positioned on a wall or floor surface. Viable reference features may also include edges or boundaries of such solid objects or designs, where such edges or boundaries may be assigned positional coordinates for location purposes.

Environment sensors 122 may be configured to detect well-defined edges of solid objects and portions (such as arc and line segments) of clearly-defined two-dimensional designs or patterns. Sensor data may be processed using image processing and/or object recognition routine to estimate a center, central axis, or other aspect of the feature for purposes of assigning and referencing a location of the feature in a fixed reference frame, such as that used in a global positioning system (GPS). Detection of features by sensors may be facilitated by such factors as color and/or shading contrasts between edges of the feature and a background of the feature or a surface on which it is positioned, by differences in distance from between the feature.

Viable reference features may also include RFID tags and/or objects having RFID tags incorporated therein. The RFID tags may be active (i.e., battery-operated) or passive. Active RFID tags may facilitate sensor detection by emitting signals detectible by the sensor(s). Such signals may be usable to determine a position of the tag or tagged object with respect to the sensor and/or the vehicle. Signals from such tags and/or objects may also be detectible by (or transmissible to) a global position system or another positioning system using a fixed frame of reference. This capability may enable the positions of the tags and/or tagged objects to be determined within the fixed reference frame, so that these positions can be related to the positions of other objects (such as vehicle 100 or a sensor) located within the fixed reference frame. Passive RFID tags may deflect carious types of incident signals, such as radar signals from environment sensors 122. The reflections may be detected by one or more of the environment sensors.

The fixed frame of reference is a reference frame that allows the location of any point to be specified with respect to a single defined origin. This may enable calculation of the positions of points relative to each other if the locations of the points with respect to the reference frame origin are known.

The predetermined number of viable reference features may be a minimum number of viable reference features needed to provide data for generation of a calibration map having sufficient accuracy and data points use for calibrating one or more environment sensors. This minimum number may depend on factors such as the characteristics of the vehicle environment (including any walls, ceiling enclosing the vehicle), lighting conditions in the vehicle environment, and other pertinent factors.

For purposes described herein, a "calibration map" is a record of a two-dimensional or three-dimension (i.e., spatial) arrangement of viable reference features detectible by at least one vehicle environment sensor, with each feature having a location specified with respect to a common reference location. In one or more arrangements, the common reference location may be a reference location defined for use by a global positioning (GPS) system in locating and tracking vehicles, GPS receivers, and other equipment configured to use the GPS system. In vehicle environments not having enough viable features for accurate calibration, the sensor calibration module 123 may determine from sensor data any viable features already existing in the vehicle environment, and may generate a digital map incorporating the existing features and including suggested positions for additional features. This may reduce the burden on a user who decides to add features to increase calibration accuracy.

An environment sensor 122 may scan an environment of the vehicle for viable features. The environment may include no viable features, some viable features but not enough to generate a calibration map, or enough viable features to generate a calibration map. Referring to FIG. 2A, for example, the environment may include garage walls 301, 303 comprising vertical surfaces. The garage interior walls may include a front wall 301 and a side wall 303. One or more of walls 301, 303 may contain windows 305 or other features attached thereto, or the walls 301, 303 may be relatively flat and featureless. Referring to FIG. 3A, in another example, the vehicle environment may include a flat, featureless ground surface 401 on which the vehicle 100 rests. One or more environment sensors of the vehicle 100 may be configured to detect viable reference features located along the ground surface 401.

Figure 4:
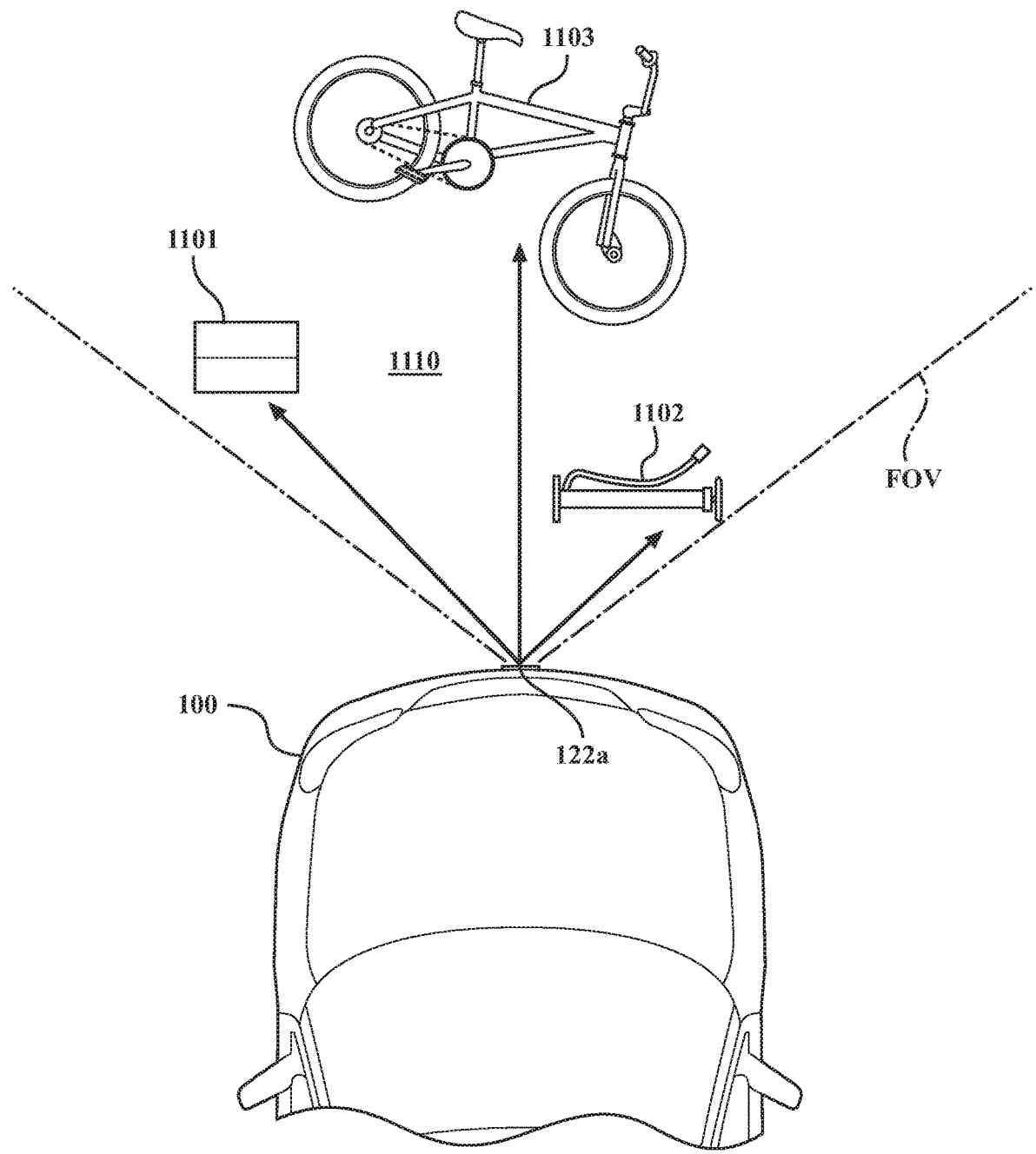
FIG. 4 is a schematic plan view of a front end of a vehicle parked on a ground or floor surface and the vehicle facing a plurality of solid objects detectible by a vehicle environment sensor and also resting on the surface.

In another example, FIG. 4 is a schematic plan view of a front end of a vehicle parked on a surface 1110, the vehicle facing a plurality of solid objects detectible by a vehicle environment sensor and also resting on the surface. Referring to FIG. 4, the environment may include one or more physical objects 1101, 1102, 1103 which may include features usable for calibration and which may be positioned within the field of view FOV of the sensor 122a. The objects 1101-1103 may be located at various positions with respect to an environment sensor detecting the objects.

Figure 5:
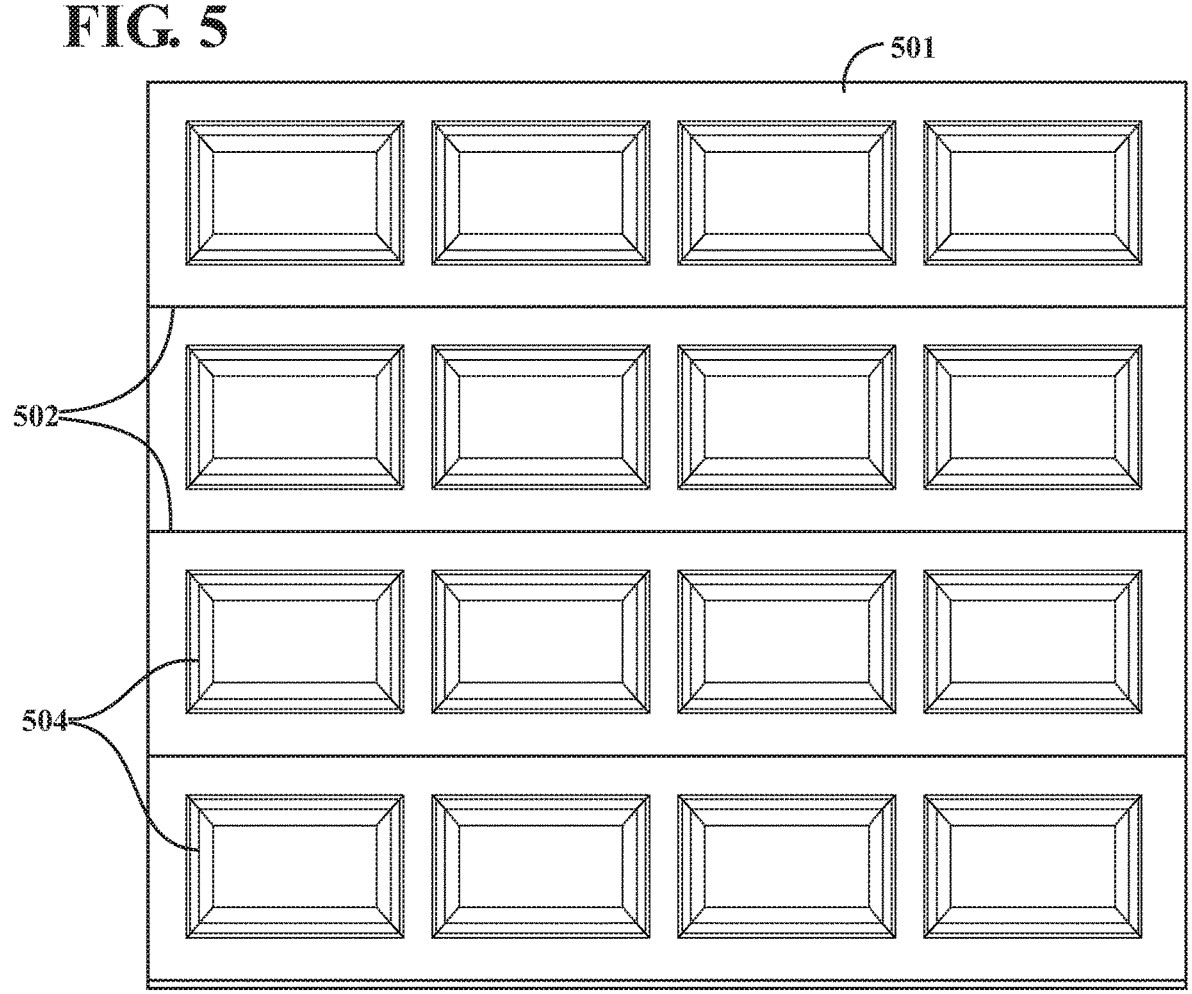
FIG. 5 is a schematic view of an exterior of a garage door incorporating viable reference features.

Referring to FIG. 5, in yet another example, viable features may be incorporated into the exterior surface of a garage door 501. The features may comprise one or more of horizontal door section seam lines 502 and a series of rectangular relief patterns 504. In any of the above scenarios and others not described, the sensor fusion algorithm 167 may aid in evaluating features and sensor data for feature definition, contrast and viability.

A detected environment of the vehicle may include the vehicle 100 and its immediate surroundings as detectible by the environment sensors. The environment may include objects suspended over or proximate the vehicle, objects resting on a ground surface near the vehicle, and/or any objects positioned along any walls or surfaces forming an enclosure of the vehicle and residing within a predetermined distance of the vehicle. The vehicle environment may include any features defined by the structures of any surfaces or objects found in the vehicle environment. The detected vehicle environment may also include two-dimensional shapes or patterns applied to walls, floor surfaces, etc. Such shapes or patterns may be usable for the calibration purposes described herein if they have sharply defined boundaries and/or edges providing a clear contrast with a surface on which the shape or patterns appears, thereby enabling a sensor to detect and process characteristics of the shape or pattern. The sensor calibration module 123 may include (or be in operable communication with) one or more object detection-type algorithms configured to recognize edges, line segments, and other viable reference features detected by the environment sensors.

The sensor calibration module 123 may include instructions that when executed by the one or more processors cause the one or more processors to, if an environment sensor cannot not detect at least a predetermined number of viable reference features spaced apart from the current location of the sensor, determine at least one suggested positional arrangement of viable reference features with respect to the current position of sensor. The sensor may be a sensor such as a radar or LIDAR sensor that would, during normal usage, detect objects and features thereof spaced apart from the vehicle. This may be a sensor capable of detecting viable reference features usable for generation of a calibration map, and for which it is desired to generate a calibration map so that the sensor may be re-calibrated as often as required.

A suitable calibration environment of the vehicle may be constructed using a suggested positional arrangement of viable reference features. A "suggested positional arrangement of viable reference features" is a two-dimensional or three-dimensional arrangement of features spaced apart from a sensor and designed to facilitate accurate determination of the position of each viable reference feature with respect to the sensor, by use of the sensor. The positional arrangement may be formulated and/or selected by the calibration module 123 based on, for example, characteristics of the current vehicle environment as detected by one or more sensors.

If the environment sensor can detect at least one existing viable reference feature spaced apart from the current location of the sensor, the at least one suggested positional arrangement of viable reference features may include information regarding a position of the at least one existing viable reference feature and information specifying a positon of at least one additional feature. A position of a viable reference feature may be specified using any sensor-detectible characteristic of the feature (for example, a detected edge or boundary). A position of a viable reference feature may be specified using a derived characteristic of the feature, such as a center of a circular shape or an estimated central axis of a representation of a physical object. Multiple positional arrangement(s) of viable features may be generated and suggested by the vehicle system, thereby affording a user multiple options for positioning added features to the vehicle environment. In one or more arrangements, the calibration module 123 may be configured to suggest positional arrangements using a smallest feasible number of added viable reference features deemed necessary to facilitate accurate sensor readings in a given vehicle environment. This may ease the burden on a user of positioning numerous additional features.

The sensor calibration module 123 may include instructions that when executed by the one or more processors cause the one or more processors to determine the at least one suggested positional arrangement of viable reference features responsive to the detected environment of the vehicle. The sensor calibration module 123 may be configured to use viable features already in the environment for calibration purposes. The sensor calibration module 123 may be configured to determine one or more positional arrangements of viable features including the existing features, so that one or more supplemental or added viable features may be added to the vehicle environment by a user to provide sufficient features for generation of a calibration map and also for subsequent use of the features and the map for sensor calibration. The sensor calibration module 123 may be configured to determine suggested positions for added features in relation to the existing features, so as to increase the amount and quality of data available to the sensors, minimize interference between detected objects, and increase calibration accuracy. To this end, in one or more arrangements, the sensor calibration module 123 may incorporate (or be in operable communication with) a positioning optimization algorithm may be used to generate suggested arrangements of viable features based on such factors as the geometry and dimensions of an enclosure in which the vehicle is positioned, position(s) of any existing feature(s) in the vehicle environment, and other factors.

The sensor calibration module 123 may suggest a positioning arrangement applicable to a flat vertical plane such as a garage wall positioned in front of the vehicle or along a side of the vehicle. The features may be positionable spaced apart at specific locations long the wall. The algorithm may be configured to space apart (in two and/or three dimensions) suggested positions of added features so as to optimize use of the features for calibration map generation and sensor calibration as described herein. In one or more arrangements, the algorithm may be configured to suggest a positioning of viable reference features designed to space apart the features within a field of view of a given sensor to provide numerous widely dispersed data points, while taking into account the detected dimensions of the vehicle environment. In one or more arrangements, a catalog of predetermined spatial arrangements for viable features may be stored in a memory. One or more such predetermined spatial arrangements may be selected by the sensor calibration module 123 based on detected characteristics of the vehicle environment, such distances of walls and other surfaces from the vehicle and other parameters.

The sensor calibration module 123 may be configured to provide a user with guidelines and/or requirements regarding the characteristics of viable reference features. This may enable readily available physical objects to be positioned by the user as determined by a suggested positional arrangement, for use as reference features. Suggested positional arrangements including relatively fewer added features and a relatively greater number of added features may be generated to enable a user to choose between the simplicity of placement of relatively fewer features and the greater data availability and calibration map detail which may be achievable with a greater number of added features.

In one or more arrangements, suggested positions of the at least one suggested positional arrangement of viable reference features comprise suggested positions for physical objects resting on a ground surface adjacent the vehicle. For example, a user may position readily available physical objects in the suggested positons. After positioning in the suggested locations, the added features may be evaluated for viability for purposes of calibration purposes. In one particular example, a post may be designed to rest on the same floor surface as the vehicle 100 and may be positioned at a desired position with respect to the vehicle or environment sensor. The post may include a stand and a stalk extending vertically upward from the stand. The stalk may support a structure including the one or more added viable reference features.

Figure 6:
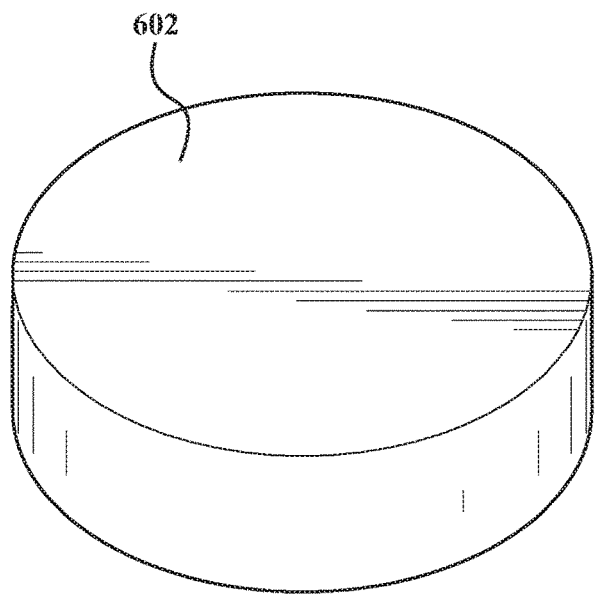
FIG. 6 is a perspective view of a dot which may include (or may function as) a viable reference feature in accordance with an embodiment described herein.

Referring now to FIG. 6, in one or more arrangements, viable added reference features may be in the form of discs or "dots" 602 positionable (using a suitable adhesive, for example) on a surface adjacent the vehicle 100, in a field of view of the environment sensor. FIG. 6 is a perspective view of a dot in accordance with an embodiment described herein. For example, one or more dots 602 may be attached to a garage vertical wall surface or garage door surface which faces toward a front of the vehicle when the vehicle is parked. Each dot may have a depth dimension to facilitate detection by the sensors and/or recognition by the sensor calibration module. The dots may have circular or other shapes and may be structured to have sharply defined edges and to maximize contrast with the surfaces on which they are positioned.

Figure 7:
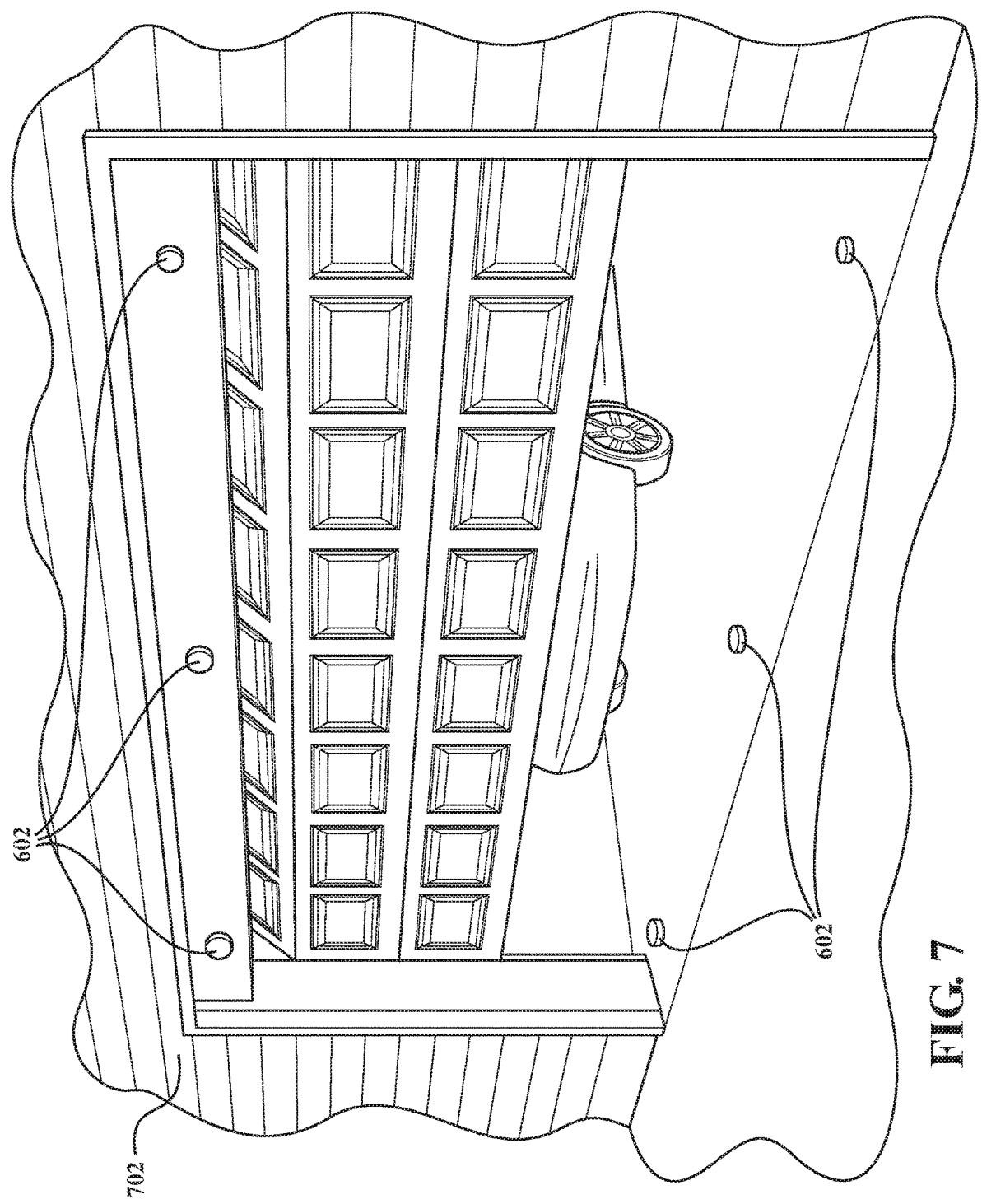
FIG. 7 shows one example of placement of dots as shown in FIG. 6, to add viable reference features to an exterior of a garage.

FIG. 7 shows one example of placement of dots 602. In the example shown, if it is determined that the garage door exterior surfaces facing toward the vehicle 100 lack sufficient viable reference features for calibration purposes, a user may add dots 602 to the exterior surfaces of a garage 702. The pattern of dots 602 may conform to a suggested positional arrangement of viable reference features as may be determined by the sensor calibration module 123 responsive to the detected dimensions and shape of the garage exterior surfaces.

In one or more arrangements, at least one viable reference feature of the at least a predetermined number of viable reference features is physically connected to an RFID tag (or is some form of RFID tag). The RFID tag may be configured to emit a signal in response to receipt of a query from an active environment sensor. The response signal may aid the sensor in locating the added feature. In particular embodiments, an RFID tag is incorporated into a "dot" of the type previously described.

In one or more arrangements, viable reference features and a suggested positional arrangement of the viable reference features are embodied in a poster including sensor-detectible shapes and/or patterns and structured to be positioned with respect to the vehicle so that the shapes and/or patterns are detectible by environment sensors. A poster incorporating sensor-detectible shapes or patterns may be attached to a wall in front of the vehicle or otherwise positioned so as to be detectible by environment sensors. The patterns/shapes may be formed from raised areas extending from a flat surface of the poster sheet and may be formed from one or more different colors. The patterns/shapes may be formed from sensor-reflective materials. Characteristics of the shapes/patterns and dimensional relationships between the shapes/patterns may be known and may serve as an added check or verification of calibration-related parameters.

In particular embodiments, a bar code, RFID tag or other identifying means may be configured for scanning by an environment sensor to convey information regarding the dimensions, spacings, and other characteristics of the shapes and patterns appearing on the poster. These known characteristics may be stored in memory for comparison with values of these parameters measured by the environment sensors or estimated using sensor data. This may provide an additional check as to accuracy of the sensor data. In particular embodiments, the poster identifying means may be scanned by a mobile device and the identifying means and/or associated information relating to the poster may be transmitted to the sensor calibration module 123 or a memory in communication therewith.

The sensor calibration module 123 may suggest the use of a poster containing viable reference features as an option in cases where, for example, a vertical wall surface is positioned spaced apart a sufficient distance from a front of the vehicle to enable a suitable environment sensor to detect features mounted on the wall surface, and where the wall surface lacks sufficient features usable for calibration.

Figure 2B:
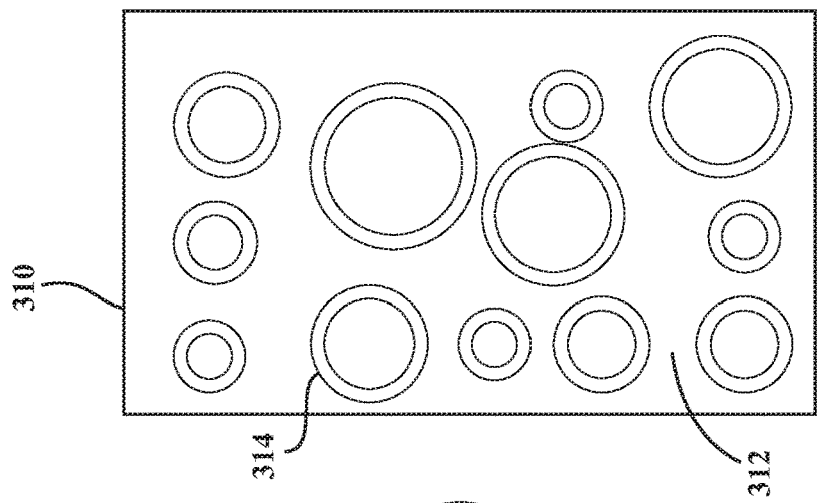
FIG. 2B is a schematic view of a poster in accordance with an embodiment described herein and configured for attachment to a vertical interior wall of a garage, such as wall surface of FIG. 2A.
Figure 2A:
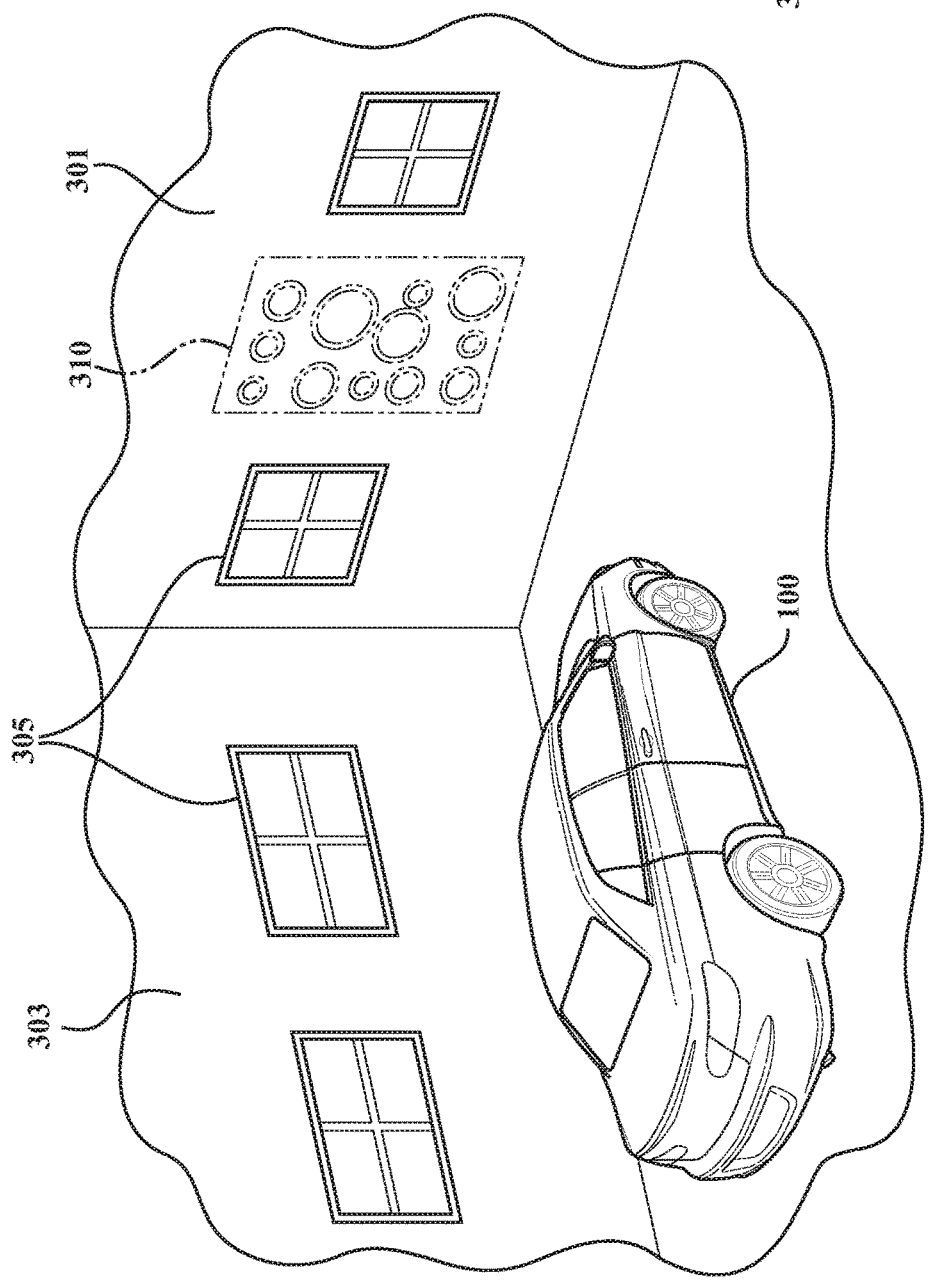
FIG. 2A is a schematic perspective view of an interior of a garage in which a vehicle may be parked for sensor calibration, and which includes a wall surface on which viable reference features may be added for calibration purposes.

FIG. 2B shows one example of a poster 310 configured for attachment to a vertical interior wall of a garage. FIG. 2A also shows the poster 310 positioned on the wall 301. The poster may include a distinctive pattern 312 comprising a plurality of circular shapes 314 configured to be easily detectible by a vehicle environment sensor, such as a radar or LIDAR. In one or more arrangements, parameters such as the radii/diameters of the circles, the thicknesses of their boundary lines, and spacing between the centers of the circles may be known. These known dimensions may be received by the sensor calibration module 123 and may be used as additional data to perform and/or confirm sensor calibration by measuring parameters of the patterns as detected by environment sensor(s) against the known pattern parameters.

Figure 3B:
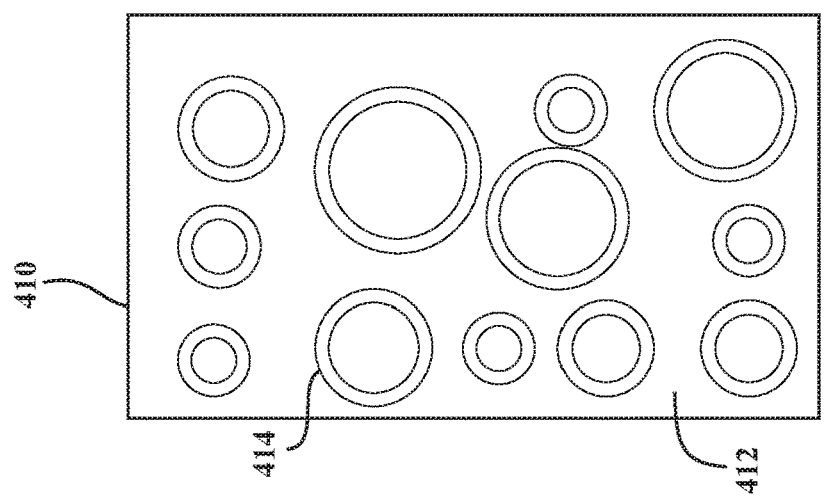
FIG. 3B is a schematic view of a poster in accordance with an embodiment described herein and configured for positioning on a ground surface adjacent the vehicle, such as ground surface of FIG. 3A.
Figure 3A:
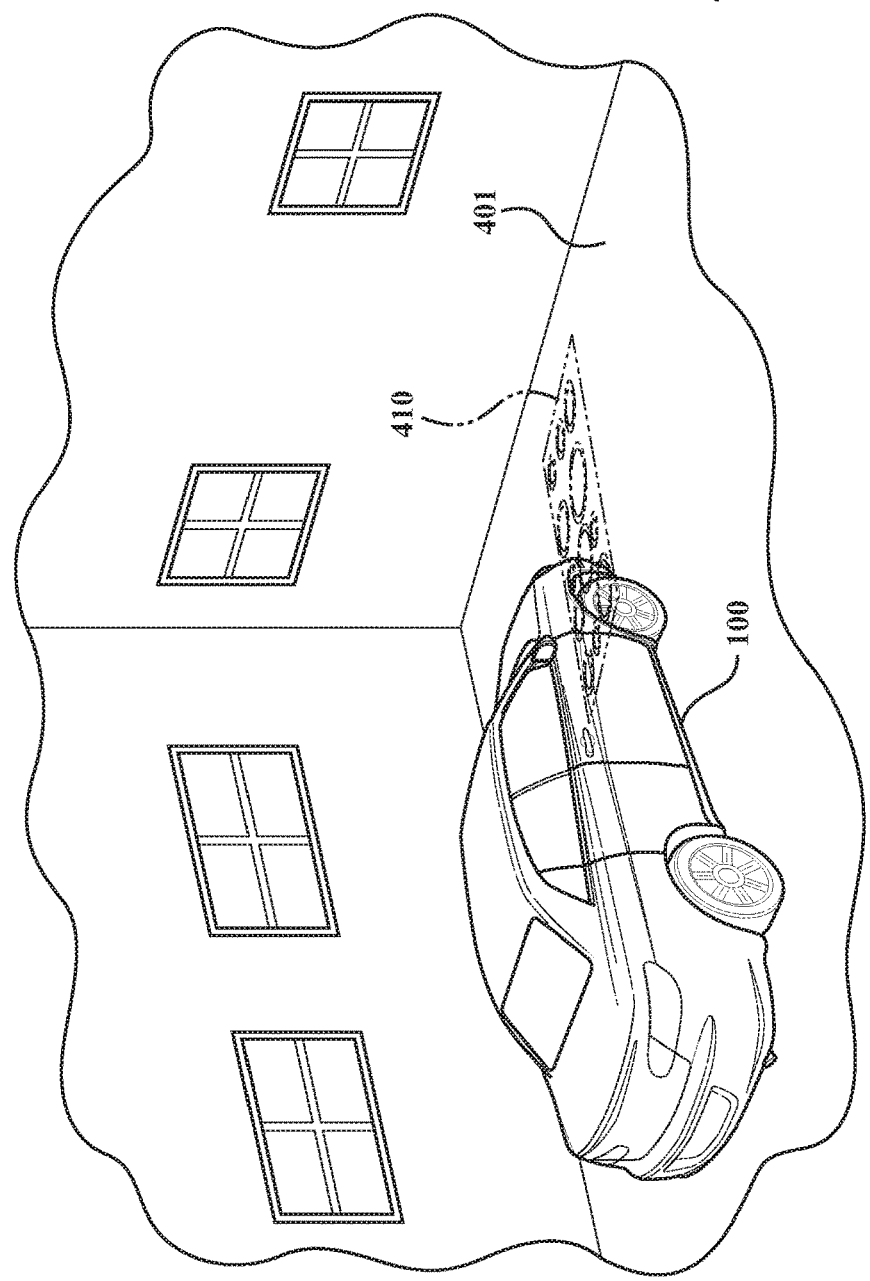
FIG. 3A is a schematic perspective view of a ground surface on which a vehicle may be parked for sensor calibration.

FIG. 3B shows one example of a similar poster 410 configured for attachment to a horizontal floor surface on which the vehicle resides. The poster may include a pattern of a plurality of circular shapes similar to that shown in FIG. 3B, configured to be easily detectible by a vehicle environment sensor, such as a radar or LIDAR.

The sensor calibration module 123 may include instructions that when executed by the one or more processors cause the one or more processors to, following determination of at least one suggested positional arrangement of viable reference features with respect to the current position of the sensor, generate instructions to arrange viable reference features in the at least one suggested positional arrangement. In one or more arrangements, the instructions for arranging the reference features may include a digital map defining positions of the viable reference features in the suggested positional arrangement(s). The digital map may be configured to be displayable on a vehicle display. The sensor calibration module 123 may be configured to (either alone or in conjunction with other elements of the vehicle 100) control operation of the vehicle display to display the map.

The digital map may display representations of the vehicle and at least a portion of the vehicle environment, and may show proposed positions of added reference features relative to the vehicle, distances of feature location points relative to the vehicle, and other pertinent information. The digital map may enable a user to position added features at locations specified on the map. If the added features are to be positioned on a floor surface, the digital map may show a plan view of the floor surface including suggested locations of the added features with respect to a position of the vehicle or an environment sensor. If the added features are to be applied to a wall surface facing a front end of the vehicle, the added features may be shown positioned on the wall surface with respect to a reference point. If multiple possible positional arrangements are provided for user selection, each positional arrangement may be shown on a separate digital map.

In one or more arrangements, the instructions for arranging the reference features may include at least one signal incorporating a digital map defining positions of the reference features in the suggested positional arrangement. The signal(s) may be transmitted from the vehicle 100 to an extra-vehicular device such as a user mobile device of a paper printer, for example. The digital map may be displayable on the user mobile device to aid the user in placement of the added features in the specified locations in the vehicle environment.

In one or more arrangements, the instructions for arranging the reference features may include at least one signal incorporating a digital map defining positions of the reference features in the suggested positional arrangement, where the signal(s) is convertible to (or includes) a printable format of the digital file. This enables a user to print a paper copy of the digital map, if so desired. The signal containing the digital map may be transmitted from the vehicle 100 to any user-specified destination, for example, an email address.

In further aspects, the sensor calibration module 123 may be configured to interactively aid a user in manual placement of added viable reference features in the vehicle environment. For example, in one or more arrangements, the instructions for arranging the reference features may include controlling operation of the vehicle to generate an audible, visible, tactile, and/or other user-detectible confirmation signal indicating when a viable reference feature becomes located in one of the positions of the suggested positional arrangement. Thus, for example, when a user has moved a feature to one of the feature positions specified in a suggested positional arrangement, the sensor calibration may (either alone or in cooperation with other elements of the vehicle 100) control operation of the vehicle to emit an audible confirmation signal (for example, via the vehicle horn) when the user has positioned a feature in one of the specified locations.

In one or more arrangements, the instructions for arranging the reference features may include generating a signal configured to prompt generation, by a mobile device, of an audible, visible, tactile, and/or other confirmation signal indicating when a viable reference feature becomes located in a position specified in a suggested positional arrangement. This may cause a "beep" or other sound to be emitted by the user's mobile device when a feature has been successfully positioned.

The sensor calibration module 123 may be configured to, after placement of added viable features in suggested positions, perform a final verification that the features are positioned in suggested positions and that the final feature arrangement detected by the sensors is sufficient for generation of a calibration map. To this end, the sensor calibration may be configured to again, after placement of the added features by the user, and for the environment sensor of the vehicle, determine if the sensor can detect at least the predetermined number of viable reference features spaced apart from a current location of the sensor.

The sensor calibration module 123 may also include instructions that when executed by the one or more processors cause the one or more processors to, if the environment sensor can detect at least the predetermined number of viable reference features, generate a calibration map including information specifying a position of each feature of the at least a predetermined number of viable reference features. For generation of the calibration map, the sensor calibration module may include instructions that when executed by the processor(s) cause the processor(s) to, using data from the environment sensor, determine a position of each viable reference feature of the at least a predetermined number of viable reference features with respect to the environment sensor. These relative positions may be determined using data from the relevant sensor. The sensor calibration module may also be configured to determine a position of the environment sensor within a fixed frame of reference. The frame of reference may be a reference frame used for a GPS system, so that the sensor and each of the viable reference features will have distinctive coordinates in the fixed reference frame. The sensor calibration module may obtain this position of the sensor from the vehicle navigation system or from a source outside the vehicle (for example, a GPS system source) via the communications interface 169. The sensor calibration module may also be configured to, for each viable reference feature of the at least a predetermined number of viable reference features detected by the environment sensor, and using the position of each viable reference feature with respect to the environment sensor and the position of the environment sensor in the fixed frame of reference, determine the position of the viable reference feature in the fixed frame of reference. The sensor calibration module may also be configured to generate a calibration map including information specifying the position of each viable reference feature in the fixed frame of reference. In one or more arrangements, a separate calibration map may be generated for each sensor for which it is desired to check calibration. Each map may use the same viable reference features, assuming they are detectible by each sensor intended to use the map for calibration. In this case, the same map generation procedure may be applied for each sensor intended to use the map for calibration.

After generation of the calibration map while the vehicle is parked, the vehicle 100 may leave the initial location where the calibration map was generated. Thereafter, whenever the vehicle 100 is parked again in the same location, the calibration map may be used to check calibration of the sensor that previously provided the initial calibration data. The sensor calibration module may include instructions that when executed by the one or more processors cause the one or more processors to estimate, when the vehicle is parked in the same location, and using data from the environment sensor previously used to gather data used for the calibration map, a position of each viable reference feature with respect to the pertinent sensor. The sensor calibration module may be configured to determine a current position of the pertinent sensor in the fixed reference frame (using GPS coordinates, for example). Then, for each viable reference feature, and using the position of the pertinent sensor in the fixed reference frame and the position of the viable reference feature with respect to the pertinent sensor, the sensor calibration module may estimate a position of the viable reference feature in the fixed reference frame. The sensor calibration module may also be configured to, for each viable reference feature, determine a calibration map position of the viable reference feature. This is the position of the reference feature on the calibration map (i.e., the position of the feature in the fixed reference frame) as established when the map was generated.

The sensor calibration module may also, for each viable reference feature, compare the estimated position of the viable reference feature in the fixed reference frame with the calibration map position of the viable reference feature. The sensor calibration module may, for each viable reference feature, if the estimated position of the viable reference feature in the fixed reference frame differs from the calibration map position of the viable reference feature by more than a predetermined amount, generate instructions for adjusting one or more operating parameters of the pertinent sensor so that the estimated position of the viable reference feature in the fixed reference frame does not differ from the calibration map position of the viable reference feature by more than the predetermined amount (i.e., the sensor calibration module may generate instructions by which the relevant sensor may be re-calibrated).

In one or more arrangements, the sensor calibration module may include instructions that when executed by the processor(s) cause the processor(s) to implement the sensor parameter adjustment instructions by automatically controlling operation of the vehicle so as to adjust one or more operating parameters of the pertinent sensor so that the estimated position of the viable reference feature in the fixed reference frame does not differ from the determined position of the viable reference feature in the fixed reference frame by more than the predetermined amount. Operating parameters of the pertinent sensor may be controlled to adjust various parameters of the sensor, such as the orientation, position, direction-of-focus, emitted signal power level, and/or other parameters. In this manner, the pertinent sensor may be automatically re-calibrated when it is determined that the estimated position of the viable reference feature in the fixed reference frame differs from the determined position of the viable reference feature in the fixed reference frame by more than the predetermined amount.

In particular embodiments, the sensor calibration module includes instructions that when executed by the processor(s) cause the processor(s) to control operation of the vehicle so as to, prior to adjusting the one or more operating parameters of the pertinent sensor, control operation of the vehicle so as to generate a signal requesting permission from a user to adjust the one or more operating parameters of the pertinent sensor. Thus, before the sensor calibration module can control the vehicle to re-calibrate the pertinent sensor, the user must give permission (for example, by entering a command or acknowledgement via input system 130). The user may pre-select whether the sensor calibration module 123 is to automatically re-calibrate sensor(s) or request permission before re-calibrating. This may enable the user to have the sensors adjusted at a vehicle dealer instead of being automatically re-calibrated, if so desired.

Figure 8:
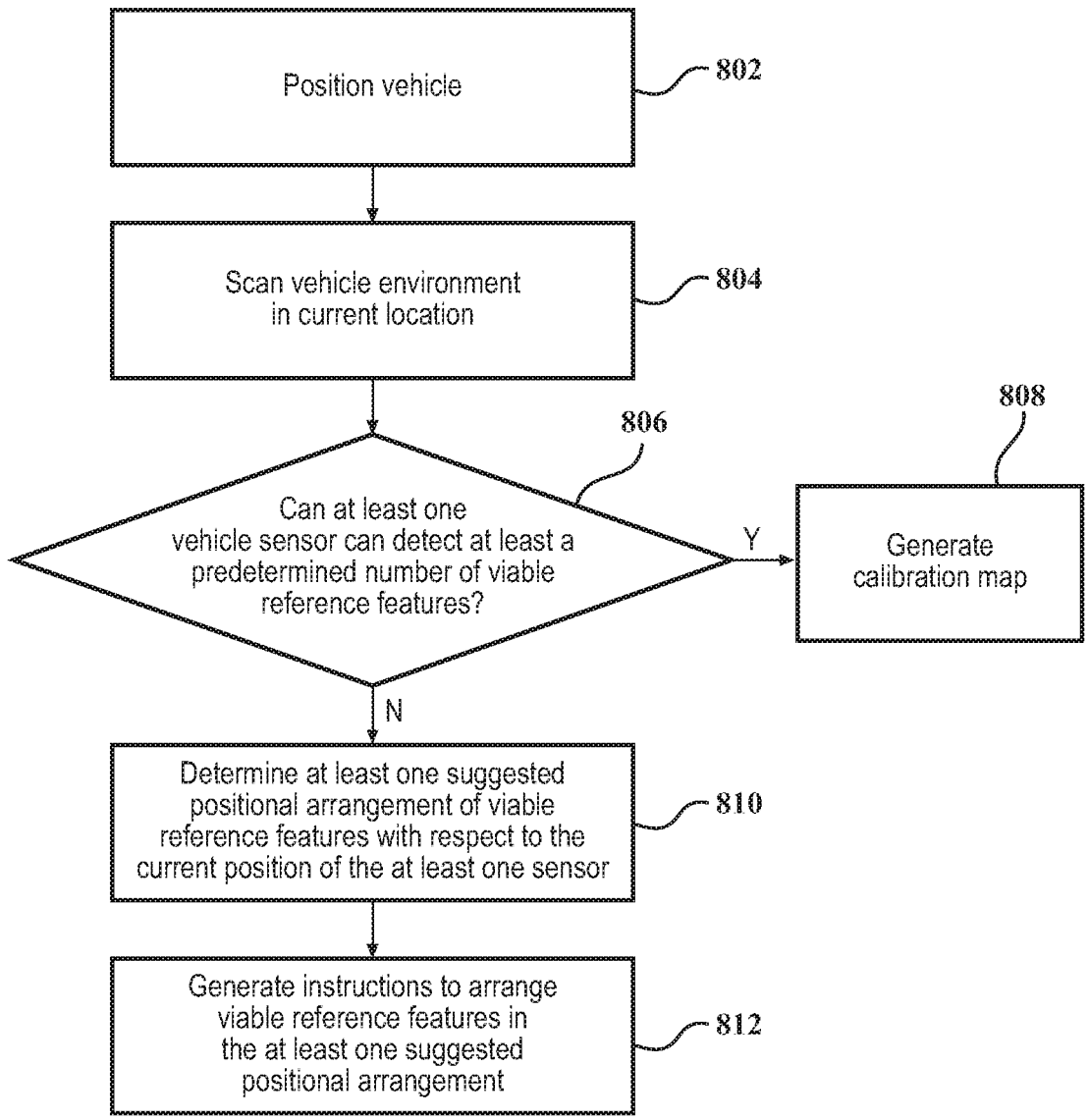
FIG. 8 is a flow diagram illustrating operation of a sensor calibration system including a sensor calibration module in accordance with an embodiment described herein, to determine if a sensor can detect sufficient viable reference features for generation of a calibration map.

FIG. 8 is a flow diagram illustrating operation of a sensor calibration system including a sensor calibration module in accordance with an embodiment described herein. The diagram shows operation of the sensor calibration module 123 to determine if a sensor can detect sufficient viable reference features for generation of a calibration map. In block 802, the vehicle 100 may be parked in a vehicle environment. The vehicle environment may be an environment where the user will frequently park the vehicle. For example, the environment may be inside a garage of the user's home, or in a driveway of the home. The vehicle 100 may be oriented in a manner in which it will usually be oriented when positioned at that location. For example, the vehicle may be parked facing a particular wall of the garage interior, or parked in the driveway facing a closed garage door.

In block 804, an environment sensor may scan the vehicle environment. In block 806, the sensor data may be analyzed to determine if the environment sensor can detect at least a predetermined number of viable reference features spaced apart from a current location of the environment sensor, as previously described. If the environment sensor can detect at least a predetermined number of viable reference features, the sensor calibration module 123 may (in block 808) generate a calibration map using data from sensor in the manner previously described. However, if the environment sensor cannot detect at least a predetermined number of viable reference features, the calibration module 123 may (in block 810) determine at least one suggested positional arrangement of viable reference features with respect to the current position of the environment sensor. The calibration module 123 may then (in block 812) generate instructions to arrange viable reference features in the at least one suggested positional arrangement, as previously described.

Figure 9:
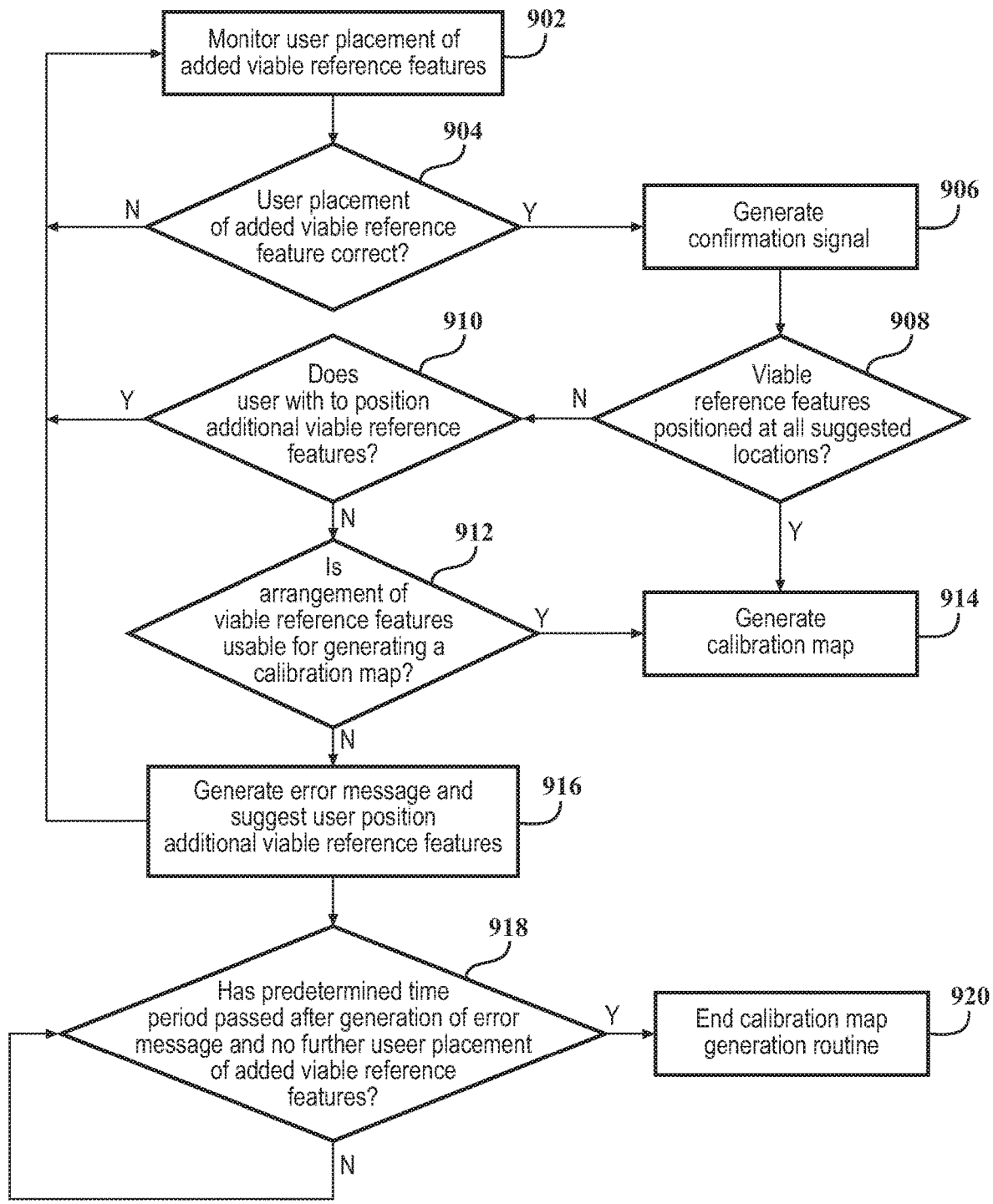
FIG. 9 is a flow diagram illustrating operation of the sensor calibration module to interactively aid a user in placement of added viable reference features to a vehicle environment currently lacking sufficient viable reference features.

FIG. 9 is a flow diagram illustrating operation of the sensor calibration module 123 to interactively aid a user in placement of added viable reference features to a vehicle environment currently lacking sufficient viable reference features. In blocks 902-904, after transmitting a digital map including suggested positions of the added viable reference features to a user, the sensor calibration module 123 may monitor user placement of an added reference feature until placement of the feature is correct. In block 906, when user placement of an added feature is correct, an audible, visual, tactile, and/or other suitable signal confirming correct positioning of an added viable reference feature may be generated. After generation of the confirmation signal, the sensor calibration module 123 may (in block 908) determine if added viable reference features have been positioned in all of the locations suggested in the digital map. If added viable reference features have been positioned in all of the suggested locations, the sensor calibration module 123 may (in bock 914) scan the newly added and pre-existing (if any) viable features and proceed with generation of the calibration map using sensor data relating to the detected viable features. However, if added viable reference features have not been positioned in all of the suggested locations, the sensor calibration module 123 may (in block 910) query the user as to whether they intend to position additional viable features. The user may be queried using any suitable means, for example, an element of the vehicle output system such as a display, or via the user mobile device.

If the user confirms that they intend to position additional viable reference features, the sensor calibration module 123 may (in block 902) continue to monitor placement of the reference features. However, if the user does not wish to position additional viable reference features, the sensor calibration module 123 may (in block 912) determine if the existing arrangement of features is usable is usable for generating a calibration map. If the existing arrangement of features is not usable is usable for generating a calibration map, the user may not have positioned enough added viable reference features in the field of view of the pertinent sensor. Then the sensor calibration module 123 may (in block 916) generate an error message to the user indicating that the existing arrangement of features is not usable for generating a calibration map, and suggesting that the user position additional viable reference features. After transmission of the error message and suggestion to the user, the sensor calibration module 123 may (in block 918) wait a predetermined time period for the user to position an added reference feature. If the user does not positon an additional viable reference feature in a suggested position by expiration of the predetermined time period, the sensor calibration module 123 may (in block 920) end the calibration map generation routine without a calibration map having been generated.

Figure 10:
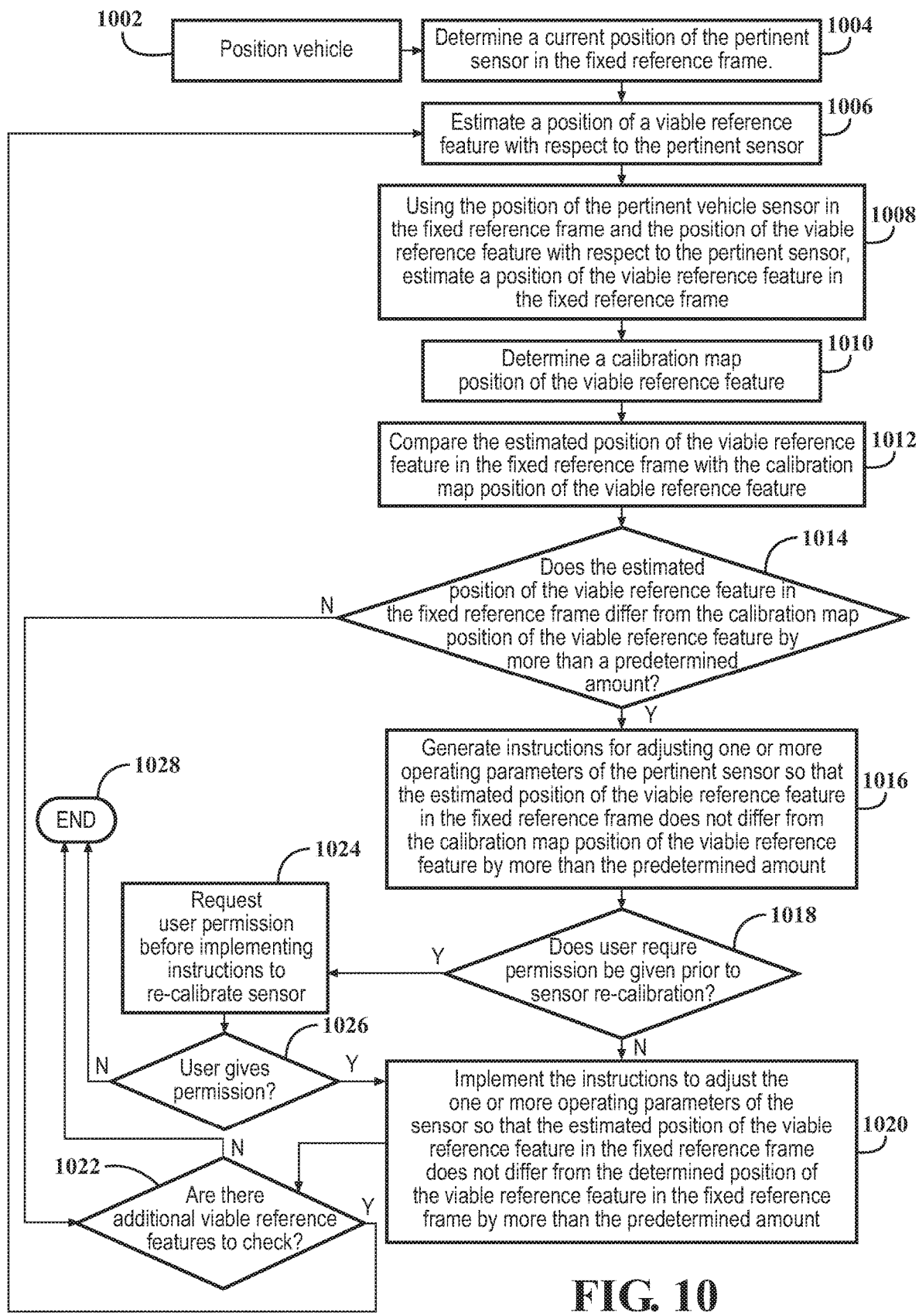
FIG. 10 is a flow diagram illustrating operation of the sensor calibration module to re-calibrate a vehicle sensor if the sensor is determined to be out of calibration.

FIG. 10 is a flow diagram illustrating operation of the sensor calibration module 123 to re-calibrate an environment sensor if the sensor is determined to be out of calibration. In block 1002, the vehicle may be positioned in the location (driveway, inside garage, etc.) where the calibration map was generated. The sensor calibration module 123 may then (in block 1004) determine a position of the pertinent sensor in the fixed reference frame. This may be done, for example, by acquiring current GPS coordinates of the pertinent sensor. The following blocks 1006-1026 may be performed for each viable reference feature on the calibration map, for the sensor whose data was used to generate the map. In block 1006, the sensor calibration module 123 may estimate a position of a viable reference feature with respect to the pertinent sensor. This may be done using sensor data acquired by scanning the viable reference feature with the sensor. The sensor calibration module 123 may then (in block 1008), using the position of the pertinent vehicle sensor in the fixed reference frame and the position of the viable reference feature with respect to with respect to the pertinent sensor, estimate a position of the viable reference feature in the fixed reference frame. The sensor calibration module 123 may then (in block 1010) determine a calibration map position of the viable reference feature.

The sensor calibration module 123 may then (in block 1012) compare the estimated position of the viable reference feature in the fixed reference frame with the calibration map position of the viable reference feature. The sensor calibration module 123 may then (in block 1014) determine if the estimated position of the viable reference feature in the fixed reference frame differs from the calibration map position of the viable reference feature by more than a predetermined amount. If the estimated position of the viable reference feature in the fixed reference frame does not differ from the calibration map position of the viable reference feature by more than the predetermined amount, control may pass to block 1022 where the sensor calibration module 123 determines whether or not there are additional viable reference features to be evaluated with regard to calibration. If there are additional viable reference features to be evaluated, control may pass to block 1006, where blocks 1006-1026 may be performed for another viable reference feature. However, if there are no additional viable reference features to be evaluated, control may pass to block 1028 (end).

Returning to block 1014, if the estimated position of the viable reference feature in the fixed reference frame differs from the calibration map position of the viable reference feature by more than the predetermined amount, the sensor calibration module 123 may (in block 1016) generate instructions for adjusting one or more operating parameters of the pertinent sensor so that the estimated position of the viable reference feature in the fixed reference frame does not differ from the calibration map position of the viable reference feature by more than the predetermined amount. The sensor calibration module 123 may then (in block 1018) determine if user permission is required in order for the sensor calibration module 123 to re-calibrate the sensor. If user permission is required in order for the sensor calibration module 123 to re-calibrate the sensor, the sensor calibration module 123 may (in block 1024) request user permission before implementing instructions to re-calibrate the sensor. This may be done by automatically controlling one or more operating parameters of the sensor as previously described. If the user does not give permission, the sensor calibration module 123 may (in block 1028) end the calibration routine. However, if the user gives permission, the sensor calibration module 123 may (in block 1020) implement the instructions to adjust the one or more operating parameters of the sensor so that the estimated position of the viable reference feature in the fixed reference frame does not differ from the determined position of the viable reference feature in the fixed reference frame by more than the predetermined amount (i.e., implement instructions for re-calibration of the sensor).

Returning to block 1018, if user permission is not required in order for the sensor calibration module 123 to re-calibrate the sensor, control may pass to block 1020 just described. After instructions for re-calibration of the sensor have been implemented, control may pass to block 1022 where the sensor calibration module 123 determines whether or not there are additional viable reference features to be evaluated with regard to calibration. If there are additional viable reference features to be evaluated, control may pass to block 1006, where blocks 1006-1026 may be performed for another viable reference feature. However, if there are no additional viable reference features to be evaluated, control may pass to block 1028 (end).

As stated previously, prior to automatically implementing instructions to adjust the sensor, parameters, the sensor calibration module 123 may (in block 1024) request user permission from the user before implementing instructions to re-calibrate pertinent sensor. If the user gives permission, the sensor calibration module 123 may (in block 1020) proceed with re-calibrating the pertinent sensor. If the user does not give permission, the calibration routine may end (block 1028).

Disclosed herein is a sensor calibration system for a vehicle. The system includes one or more processors. The system also includes a memory communicably coupled to the one or more processors and storing a sensor calibration module including instructions that when executed by the one or more processors cause the one or more processors to, for an environment sensor of the vehicle, determine if the sensor can detect at least a predetermined number of viable reference features in an environment of the vehicle. The module also includes processor-executable instructions to, if the sensor cannot not detect at least a predetermined number of viable reference features, determine at least one suggested positional arrangement of viable reference features with respect to a current position the sensor. The module also includes processor-executable instructions to generate instructions to arrange viable reference features in the at least one suggested positional arrangement.

In other aspects, the disclosure describes a non-transitory computer readable medium for determining modifications to a vehicle environment to facilitate calibration of an environment sensor of a vehicle. The medium has stored therein instructions that, when executed by a computing system, cause the computing system to perform functions including, by an environment sensor of a vehicle, determining if the sensor can detect at least a predetermined number of viable reference features in an environment of the vehicle. The medium also has stored therein instructions to, if the sensor cannot not detect at least a predetermined number of viable reference features in the vehicle environment, determine at least one suggested positional arrangement of viable reference features with respect to a current position the sensor. The medium also has stored therein instructions to generate instructions to arrange viable reference features in the at least one suggested positional arrangement.

In other aspects, the disclosure describes a method for modifying or adapting a vehicle environment to facilitate calibration of a sensor. The method includes a step of, by an environment sensor of the vehicle, determining if the sensor can detect at least a predetermined number of viable reference features in the vehicle environment. The method also includes a step of, if the sensor cannot not detect at least a predetermined number of viable reference features in the vehicle environment, determining at least one suggested positional arrangement of viable reference features with respect to a current position the sensor. The method includes a step of generating instructions to arrange viable reference features in the at least one suggested positional arrangement.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:
1. A sensor calibration system for a vehicle, the system comprising:
   one or more processors; and
   a memory communicably coupled to the one or more processors and storing a sensor calibration module including instructions that when executed by the one or more processors cause the one or more processors to:

for an environment sensor of the vehicle, determine if the sensor can detect at least a predetermined number of viable reference features in an environment of the vehicle;

if the sensor cannot not detect at least a predetermined number of viable reference features, determine at least one suggested positional arrangement of viable reference features with respect to a current position the sensor; and generate instructions to arrange viable reference features in the at least one suggested positional arrangement.

2. The sensor calibration system of claim 1 wherein suggested positions of the at least one suggested positional arrangement of viable reference features comprise suggested positions for physical objects resting on a ground surface adjacent the vehicle.

3. The sensor calibration system of claim 1 wherein viable reference features and a suggested positional arrangement of the viable reference features are embodied in a poster including a plurality of shapes and/or patterns configured to be detectible by the sensor.

4. The sensor calibration system of claim 1 wherein, if the sensor can detect at least one existing viable reference feature, the at least one suggested positional arrangement of viable reference features includes information regarding a position of the at least one existing viable reference feature and information specifying a positon of at least one additional feature.

5. The sensor calibration system of claim 1 wherein the instructions include:
a digital map defining positions of the viable reference features of the at least one suggested positional arrangement of viable reference features, the digital map being configured to be displayable on a vehicle display; and
instructions configured to control operation of a vehicle display to display the digital map.

6. The sensor calibration system of claim 1 wherein the instructions include:
at least one signal incorporating a digital map defining positions of the viable reference features of the at least one suggested positional arrangement of viable reference features, the digital map being configurable to be displayable on a mobile device; and
instructions controlling operation of the vehicle to transmit the at least one signal.

7. The sensor calibration system of claim 1 wherein the instructions include:
at least one signal incorporating a digital map defining positions of the viable reference features of the at least one suggested positional arrangement of viable reference features, the digital map being configurable to be printable on a printing device; and
instructions controlling operation of the vehicle to transmit the at least one signal.

8. The sensor calibration system of claim 1 wherein the instructions include instructions controlling operation of the vehicle to generate a confirmation signal indicating when a viable reference feature becomes located in a position of the at least one suggested positional arrangement of viable reference features.

9. The sensor calibration system of claim 1 wherein the instructions include generating a signal configured to prompt generation, by a mobile device, of a user-detectible confirmation signal indicating when a viable reference feature becomes located in a position of the at least one suggested positional arrangement of viable reference features.

10. The sensor calibration system of claim 1 wherein the sensor calibration module includes instructions that when executed by the one or more processors cause the one or more processors to, following arrangement of viable reference features in the at least one suggested positional arrangement and if the environment sensor can detect at least the predetermined number of viable reference features, generate a calibration map including information specifying a position of each viable reference feature.

11. The sensor calibration system of claim 10 wherein the sensor calibration module includes instructions that when executed by the one or more processors cause the one or more processors to:
using data from the sensor, determine a position of each viable reference feature of the at least a predetermined number of viable reference features with respect to a current position of the sensor;
determine a current position of the sensor within a fixed frame of reference;
for each viable reference feature of the at least a predetermined number of viable reference features, and using the position of the viable reference feature with respect to the current position of the sensor and the current position of the sensor within the fixed frame of reference, determine the position of the viable reference feature in the fixed frame of reference; and
generate a calibration map including information specifying the position of each viable reference feature in the fixed frame of reference.

12. The sensor calibration system of claim 10 wherein the sensor calibration module includes instructions that when executed by the one or more processors cause the one or more processors to:
determine a current position of the sensor in a fixed reference frame; and
for each viable reference feature:
estimate, using data from the sensor, a position of the viable reference feature with respect to the sensor;
using the position of the sensor in the fixed reference frame and the position of the viable reference feature with respect to sensor, estimate a position of the viable reference feature in the fixed reference frame;
determine a calibration map position of the viable reference feature;
compare the estimated position of the viable reference feature in the fixed reference frame with the calibration map position of the viable reference feature; and
if the estimated position of the viable reference feature in the fixed reference frame differs from the calibration map position of the viable reference feature by more than a predetermined amount, generate instructions for adjusting one or more operating parameters of the sensor so that the estimated position of the viable reference feature in the fixed reference frame does not differ from the calibration map position of the viable reference feature by more than the predetermined amount.

13. The sensor calibration system of claim 12 wherein the sensor calibration module includes instructions that when executed by the one or more processors cause the one or more processors to control operation of the vehicle so as to implement the instructions to adjust the one or more operating parameters of the sensor so that the estimated position of the viable reference feature in the fixed reference frame does not differ from the calibration map position of the viable reference feature in the fixed reference frame by more than the predetermined amount.

14. The sensor calibration system of claim 13 wherein the sensor calibration module includes instructions that when executed by the one or more processors cause the one or more processors to control operation of the vehicle so as to, prior to adjusting the one or more operating parameters of the sensor, control operation of the vehicle so as to generate a signal requesting permission from a user to adjust the one or more operating parameters of the sensor.

15. A non-transitory computer readable medium for determining modifications to a vehicle environment to facilitate calibration of an environment sensor of a vehicle, the medium having stored therein instructions that, when executed by a computing system, cause the computing system to perform functions comprising:
  by an environment sensor of a vehicle, determining if the sensor can detect at least a predetermined number of viable reference features in an environment of the vehicle;
  if the sensor cannot not detect at least a predetermined number of viable reference features in the vehicle environment, determining at least one suggested positional arrangement of viable reference features with respect to a current position the sensor; and
  generating instructions to arrange viable reference features in the at least one suggested positional arrangement.

16. The non-transitory computer readable medium of claim 15 having stored therein instructions that, when executed by a computing system, cause the computing system to perform functions comprising, following positioning of viable reference features in the at least one suggested positional arrangement and if the environment sensor can detect at least the predetermined number of viable reference features, generating a calibration map including information specifying a position of each viable reference feature.

17. A method for modifying a vehicle environment to facilitate calibration of a sensor,
  the method comprising steps of:
  by an environment sensor of a vehicle, determining if the sensor can detect at least a predetermined number of viable reference features in the vehicle environment;
  if the sensor cannot not detect at least a predetermined number of viable reference features in the vehicle environment, determining at least one suggested positional arrangement of viable reference features with respect to a current position the sensor; and
  generating instructions to arrange viable reference features in the at least one suggested positional arrangement.

18. The method of claim 17 further comprising steps of:
  positioning viable reference features in the at least one suggested positional arrangement; and
  following positioning of the viable reference features in the at least one suggested positional arrangement and if the environment sensor can detect at least the predetermined number of viable reference features, generating a calibration map including information specifying a position of each viable reference feature.

* * * * *